United States Patent
Eldar et al.

(10) Patent No.: US 10,393,869 B2
(45) Date of Patent: Aug. 27, 2019

(54) SUB-NYQUIST RADAR PROCESSING USING DOPPLER FOCUSING

(71) Applicant: Technion Research & Development Foundation Ltd., Haifa (IL)

(72) Inventors: Yonina Eldar, Haifa (IL); Omer Bar-Ilan, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 605 days.

(21) Appl. No.: 14/436,910

(22) PCT Filed: Oct. 24, 2013

(86) PCT No.: PCT/IB2013/059602
§ 371 (c)(1),
(2) Date: Apr. 20, 2015

(87) PCT Pub. No.: WO2014/080303
PCT Pub. Date: May 30, 2014

(65) Prior Publication Data
US 2015/0285905 A1    Oct. 8, 2015

Related U.S. Application Data

(60) Provisional application No. 61/722,453, filed on Nov. 5, 2012.

(51) Int. Cl.
*G01S 13/53*    (2006.01)
*G01S 7/292*    (2006.01)
*G01S 7/288*    (2006.01)

(52) U.S. Cl.
CPC ............ *G01S 13/53* (2013.01); *G01S 7/2923* (2013.01); *G01S 2007/2883* (2013.01)

(58) Field of Classification Search
CPC ............ G01S 13/50–64; G01S 7/2923; G01S 2007/2883; G01S 15/50–62; G01S 2013/9047; G01S 17/50–58
See application file for complete search history.

(56) References Cited

U.S. PATENT DOCUMENTS

| | | | | |
|---|---|---|---|---|
| 4,106,019 A | * | 8/1978 | Alexander | G01S 7/2923 342/108 |
| 5,416,488 A | * | 5/1995 | Grover | G01S 7/2927 342/109 |

(Continued)

FOREIGN PATENT DOCUMENTS

| | | |
|---|---|---|
| WO | 2012020530 A1 | 2/2012 |
| WO | 2012056357 A1 | 5/2012 |

OTHER PUBLICATIONS

Parker, Michael, "Radar Basics—Part 2: Pulse Doppler Radar" Altera Corporation. May 28, 2011. Accessed Sep. 19, 2018. <https://www.eetimes.com/document.asp?doc_id=1278808> (Year: 2011).*

(Continued)

*Primary Examiner* — Matthew M Barker
(74) *Attorney, Agent, or Firm* — Kliger & Associates

(57) ABSTRACT

A method includes receiving a signal, which includes reflections of multiple pulses from one or more targets (24). A Doppler focusing function, in which the reflections of the multiple pulses from each target accumulate in-phase to produce a respective peak associated with a respective delay and a respective Doppler frequency of the target, is evaluated based on the received signal. Respective delays and Doppler frequencies of the targets are estimated based on the Doppler focusing function.

20 Claims, 1 Drawing Sheet

(56) References Cited

U.S. PATENT DOCUMENTS

| | | | | |
|---|---|---|---|---|
| 6,188,348 | B1* | 2/2001 | Raney | G01S 7/288 342/120 |
| 6,313,785 | B1* | 11/2001 | Mattox | G01S 7/292 342/106 |
| 6,809,682 | B1* | 10/2004 | Madewell | G01S 13/24 342/159 |
| 6,822,606 | B2* | 11/2004 | Ponsford | G01S 3/74 342/159 |
| 7,151,483 | B2* | 12/2006 | Dizaji | G01S 7/36 342/201 |
| 7,667,639 | B2* | 2/2010 | Cheng | G01S 7/4004 342/165 |
| 8,013,781 | B2* | 9/2011 | Stockmann | G01S 7/2923 342/159 |
| 8,032,085 | B2 | 10/2011 | Mishali et al. | |
| 8,457,579 | B2 | 6/2013 | Mishali et al. | |
| 8,842,037 | B2* | 9/2014 | Emery | G01S 7/415 342/104 |
| 2003/0174088 | A1* | 9/2003 | Dizaji | G01S 7/2927 342/93 |
| 2005/0179579 | A1* | 8/2005 | Pinder | G01S 7/2926 342/25 R |
| 2007/0040729 | A1* | 2/2007 | Ohnishi | G01S 7/292 342/93 |
| 2010/0049470 | A1* | 2/2010 | Szajnowski | G01S 7/35 702/159 |
| 2011/0225218 | A1 | 9/2011 | Eldar et al. | |
| 2012/0105276 | A1 | 5/2012 | Ryland | |
| 2012/0313808 | A1* | 12/2012 | Frohling | G01S 13/5242 342/90 |
| 2013/0038479 | A1 | 2/2013 | Eldar et al. | |
| 2013/0187682 | A1 | 7/2013 | Eldar et al. | |
| 2013/0257645 | A1* | 10/2013 | Penney | G01S 13/50 342/159 |

OTHER PUBLICATIONS

T. L. Marzetta, E. A. Martinsen and C. P. Plum, "Fast pulse Doppler radar processing accounting for range bin migration," The Record of the 1993 IEEE National Radar Conference, Lynnfield, MA, USA, 1993, pp. 264-268.doi: 10.1109/NRC.1993.270453 (Year: 1993).*
Tur et al., "Innovation Rate Sampling of Pulse Streams with Application to Ultrasound Imaging", IEEE Transactions on Signal Processing, vol. 59, No. 4, pp. 1827-1842, Apr. 2011.
Gedalyahu et al., "Multichannel Sampling of Pulse Streams at the Rate of Innovation," IEEE Transactions on Signal Processing, vol. 59, No. 4, pp. 1491-1504, Apr. 2011.
Baransky et al., "A Sub-Nyquist Radar Prototype: Hardware and Algorithms", Department of Electrical Engineering, Technion-Israel Institute of Technology, Submitted to IEEE Transactions on Aerospace and Electronic Systems, Special Issue on Compressed Sensing for Radar, 14 pages, Aug. 2012.
Vetterli et al., "Sampling signals with finite rate of innovation", IEEE Transactions on Signal Processing, vol. 50, No. 6, pp. 1417-1428, Jun. 2002.
Mishali et al., "Xampling: Signal Acquisition and Processing in Union of Subspaces", IEEE Transactions on Signal Processing, vol. 59, No. 10, pp. 4719-4734, Oct. 2011.
Mishali et al., "Xampling: Analog to Digital at Sub Nyquist Rates", Technion—Israel Institute of Technology, Department of Electrical Engineering, Published in IET Circuits, Devices & Systems, vol. 5, No. 1, pp. 8-20, Jan. 2011.
Sarkar et al., "Using the Matrix Pencil Method to Estimate the Parameters of a Sum of Complex Exponentials", IEEE Antennas and Propagation Magazine, vol. 37, No. 1, pp. 48-55, Feb. 1995.
Rudelson et al., "On Sparse Reconstruction from Fourier and Gaussian Measurements", Communications on Pure and Applied Mathematics, vol. LXI, pp. 1025-1045, 2008.
Herman et al., "High-resolution radar via compressed sensing", IEEE Transactions on Signal Processing, vol. 57, No. 6, pp. 2275-2284, Jun. 2009.
Baraniuk et al., "Compressive Radar Imaging", IEEE Radar Conference, 6 pages, Apr. 2007.
Bajwa et al., "Identification of Parametric Underspread Linear Systems and Super-Resolution Radar", IEEE Transactions on Signal Processing, vol. 59, No. 6, pp. 2548-2561, Jun. 2011.
Zhang et al., Adaptive Compressed Sensing Radar Oriented Toward Cognitive Detection in Dynamic Sparse Target Scene, IEEE Transactions on Signal Processing, vol. 60, No. 4, Apr. 2012.
Wagner et al., "Compressed Beamforming in Ultrasound Imaging", IEEE Transactions on Signal Processing, vol. 60, No. 9, pp. 4643-4657, Sep. 2012.
Skolnik., "Radar Handbook", 3rd Edition, The McGraw-Hill Companies, 1352 pages, year 2008.
Bienvenu et al., "Adaptivity to Background Noise Spatial Coherence for High Resolution Passive Methods",IEEE International Conference on Acoustics, Speech and Signal Processing, vol. 5, pp. 307-310, Apr. 1980.
Schmidt et al., "Multiple Emitter Location and Signal Parameter—Estimation", IEEE Transactions on Antennas and Propagation, vol. AP-34, No. 3, pp. 276-280, Mar. 1986.
Roy et al., "ESPRIT—Estimation of Signal Parameters via Rotational Invariance Techniques", IEEE Transactions on Acoustics Speech and Signal Processing, vol. 37, No. 7 pp. 984-995, Jul. 1989.
Mallat et al., "Matching pursuits with time-frequency dictionaries", IEEE Transactions on Signal Processing, vol. 41, No. 12, pp. 3397, 3415, Dec. 1993.
Demissie, B., "High-Resolution Range-Doppler Imaging by Coherent Block-Sparse Estimation," International Workshop on Compressed Sensing Applied to Radar, 1 page, May 2012—Abstract.
Blumensath et al., "Iterative hard thresholding for compressed sensing", Applied and Computational Harmonic Analysis, vol. 27, pp. 265-274, year 2009.
Smith et al., "Compressed Sampling for Pulse Doppler Radar", IEEE Radar Conference, 6 pages, May 10-14, year 2010.
Schwarz, G., "Estimating the Dimension of a Model", Institute of Mathematical Statistics,The Annals of Statistics, vol. 6, No. 2 , pp. 461-464, Mar. 1978.
Wax et al., "Detection of Signals by Information Theoretic Criteria", IEEE Transaction on Acoustics, Speech and Signal Processing, vol. ASSP-33, No. 2, pp. 387-392, Apr. 1985.
Fuchs et al., "Estimating the Number of Sinusoids in Additive White Noise", IEEE Transaction on Acoustics, Speech and Signal Processing, vol. 36, No. 12, pp. 1846-1853, Dec. 1988.
Harris, F., "On the Use of Windows for Harmonic Analysis with the Discrete Fourier Transform", Processing of the IEEE, vol. 66, No. 1, pp. 51-83, Jan. 1978.
Duarte et al., "Structured Compressed Sensing: From Theory to Applications"., IEEE Transactions on Signal Processing, vol. 59, No. 9, pp. 4053-4085, Sep. 2011.
Bar-Ilan et al., "Sub-Nyquist Radar via Doppler Focusing", Department of Electrical Engineering, Technion—Israel Institute of Technology, 11 pages, Nov. 4, 2012.
International application # PCT/IB2013/059602 Search Report dated Mar. 5, 2014.
Stoica et al., "Introduction to Spectral Analysis", Prentice-Hall, 447 pages, year 2000—Abstract.

* cited by examiner

SUB-NYQUIST RADAR PROCESSING USING DOPPLER FOCUSING

CROSS-REFERENCE TO RELATED APPLICATIONS

This application claims the benefit of U.S. Provisional Patent Application 61/722,453, filed Nov. 5, 2012, whose disclosure is incorporated herein by reference.

FIELD OF THE INVENTION

The present invention relates generally to signal processing and analog to digital conversion, and particularly to methods and systems for sub-Nyquist sampling and processing of pulsed signals.

BACKGROUND OF THE INVENTION

Various methods and systems for sub-Nyquist signal processing are known in the art. For example, U.S. Pat. No. 8,457,579, whose disclosure is incorporated herein by reference, describes a method for signal processing that includes distributing an analog input signal to a plurality of processing channels. In each processing channel, the input signal is mixed with a respective periodic waveform including multiple spectral lines, so as to produce a respective baseband signal in which multiple spectral slices of the input signal are superimposed on one another. The baseband signal produced in each of the processing channels is digitized, to produce a set of digital sample sequences that represent the input signal.

U.S. Pat. No. 8,032,085, whose disclosure is incorporated herein by reference, describes a signal processing method that includes sampling an analog signal, which has a spectral density defining one or more bands, to produce a digitized signal. A spectral transform of the digitized signal is expressed as a matrix multiplied by a vector, wherein the vector includes multiple elements that represent the spectral density of the analog signal as a function of frequency within respective spectral slices. Indices of a subset of the elements of the vector, in which the spectral density is concentrated, is determined. The analog signal is reconstructed from the digitized signal using the subset of the elements of the vector and a corresponding subset of columns of the matrix having the indices.

U.S. Patent Application Publication 2011/0225218, whose disclosure is incorporated herein by reference, describes a method that includes accepting an analog input signal that includes a sequence of pulses. The analog input signal is filtered so as to produce a filter output, using a filter whose time-domain response is confined to a finite time period and whose frequency-domain response is non-zero at a finite set of integer multiples of a frequency shift $\Delta\omega$, and is zero at all other integer multiples of $\Delta\omega$. The filter output is sampled so as to produce digital samples. Respective amplitudes and time positions of the pulses in the sequence are calculated based on the digital samples.

U.S. Patent Application Publication 2013/0038479, whose disclosure is incorporated herein by reference, describes a method that includes accepting an analog input signal including a sequence of pulses of a given pulse shape. The analog input signal is distributed to multiple processing channels operating in parallel. The analog input signal is sampled by performing, in each of the multiple processing channels, the operations of: mixing the analog input signal with a different, respective modulating waveform to produce a mixed signal; filtering the mixed signal; and digitizing the filtered mixed signal to produce a respective digital channel output.

U.S. Patent Application Publication 2013/0187682, whose disclosure is incorporated herein by reference, describes a method for signal processing that includes accepting an analog signal, which consists of a sequence of pulses confined to a finite time interval. The analog signal is sampled at a sampling rate that is lower than a Nyquist rate of the analog signal and with samples taken at sample times that are independent of respective pulse shapes of the pulses and respective time positions of the pulses in the time interval.

SUMMARY OF THE INVENTION

An embodiment of the present invention that is described herein provides a method including receiving a signal, which includes reflections of multiple pulses from one or more targets. A Doppler focusing function, in which the reflections of the multiple pulses from each target accumulate in-phase to produce a respective peak associated with a respective delay and a respective Doppler frequency of the target, is evaluated based on the received signal. Respective delays and Doppler frequencies of the targets are estimated based on the Doppler focusing function.

In some embodiments, receiving the signal includes sampling the signal with a sampling rate that is lower than a Nyquist rate of the pulses, and evaluating the Doppler focusing function includes processing the sampled signal at a processing rate that is lower than the Nyquist rate. In a disclosed embodiment, estimating the delays and the Doppler frequencies includes defining multiple Doppler-frequency bands and, for each band in at least a subset of the bands, estimating the delays for one or more of the targets whose Doppler frequency falls in the band.

In an embodiment, estimating the delays and the Doppler frequencies includes identifying peaks of the Doppler focusing function, and deriving the delays and the Doppler frequencies from the identified peaks. In another embodiment, receiving the signal includes sampling the signal, and estimating the delays and the Doppler frequencies includes identifying a given peak in the Doppler focusing function, deriving a delay and a Doppler frequency of a target from the given peak, adjusting the sampled signal to remove a contribution of the target, re-evaluating the Doppler focusing function based on the adjusted sampled signal, and searching for a next peak in the re-evaluated Doppler focusing function.

In yet another embodiment, evaluating the Doppler focusing function includes calculating a Fourier transform coefficient matrix over a uniform grid of the Doppler frequencies. In still another embodiment, evaluating the Doppler focusing function includes windowing the Doppler focusing function using a window function.

There is additionally provided, in accordance with an embodiment of the present invention, apparatus including a sampling unit and digital processing circuitry. The sampling unit is configured to sample a received signal that includes reflections of multiple pulses from one or more targets. The digital processing circuitry is configured to evaluate, based on the sampled signal, a Doppler focusing function in which the reflections of the multiple pulses from each target accumulate in-phase to produce a respective peak associated with a respective delay and a respective Doppler frequency of the target, and to estimate respective delays and Doppler frequencies of the targets based on the Doppler focusing function.

There is further provided, in accordance with an embodiment of the present invention, apparatus including a receiver and a processor. The receiver is configured to receive a signal that includes reflections of multiple pulses from one or more targets. The processor is configured to evaluate, based on the received signal, a Doppler focusing function in which the reflections of the multiple pulses from each target accumulate in-phase to produce a respective peak associated with a respective delay and a respective Doppler frequency of the target, and to estimate respective delays and Doppler frequencies of the targets based on the Doppler focusing function.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for processing radar signals. In the disclosed embodiments, a radar system transmits a signal comprising a train of pulses, and receives a reflected signal comprising reflections of the pulses from one or more targets. The system then samples and processes the received signal, so as to reconstruct the amplitude, delay and Doppler frequency associated with each target. In some embodiments, all sampling and reconstruction are performed at a sub-Nyquist rate, i.e., below the Nyquist rate of the pulses that is typically given by twice the highest signal frequency.

In some embodiments, the system uses the samples of the received signal to evaluate a Doppler focusing function. The Doppler focusing function is a two-dimensional function, in which reflections of the pulses from each target accumulate in phase to produce a peak that is indicative of the target's Doppler frequency and delay. The Doppler focusing function may be evaluated either in the time domain or in the frequency domain. The system then derives the amplitude, delay and Doppler frequency of each target from the maxima Doppler focusing function. The derivation of target parameters is performed either directly or in an iterative fashion repeating the process one target at a time.

The use of the Doppler focusing function provides high immunity to noise and clutter, as well as fine Doppler resolution. Since the entire sampling and parameter reconstruction process is performed at a low, sub-Nyquist rate, the cost, size and power consumption of the radar system can be significantly reduced.

System Description

Figure 1:
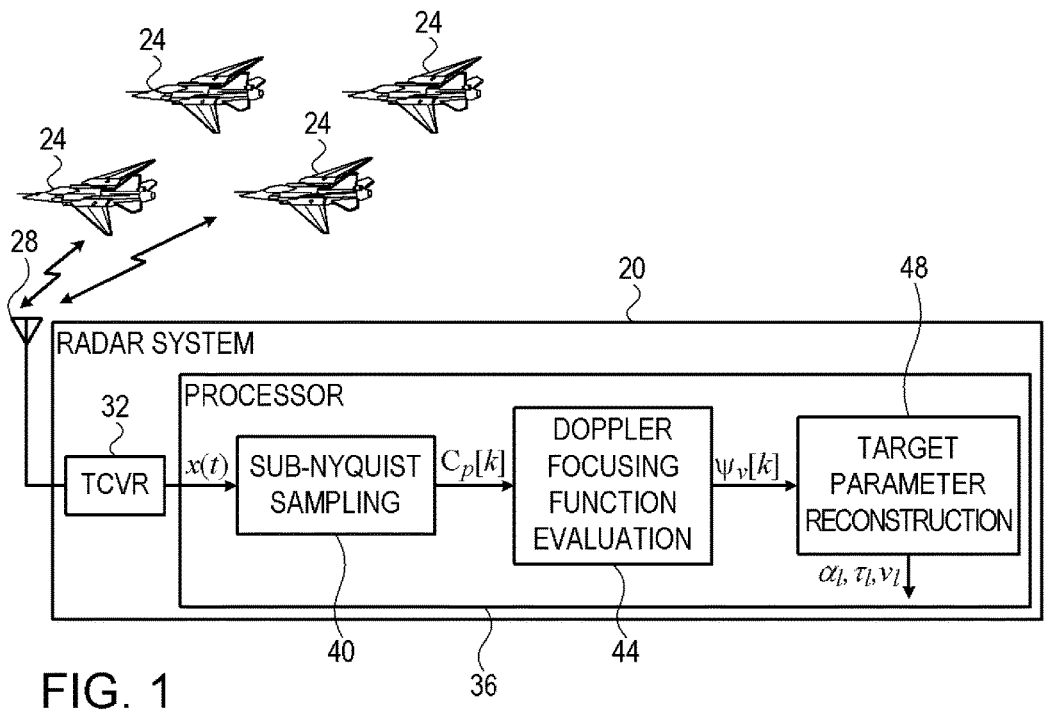
FIG. 1 is a block diagram that schematically illustrates a sub-Nyquist radar system, in accordance with an embodiment of the present invention.

FIG. 1 is a block diagram that schematically illustrates a sub-Nyquist radar system 20, in accordance with an embodiment of the present invention. System 20 detects and estimates parameters of one or more targets 24. In the present example, the targets comprise aircraft and the estimated parameters comprise the Radar Cross Section (RCS), range and radial velocity of each target. Alternatively, however, system 20 may detect any other suitable type of target in any other suitable application.

In the embodiment of FIG. 1, system 20 comprises an antenna 28 for transmitting pulsed Radio Frequency (RF) signals toward the targets and for receiving reflections of the pulsed signals from the targets. A transceiver (transmitter-receiver) 32 generates the pulsed signals for transmission, and receives and down-converts the received reflections. A processor 36 samples (digitizes) the down-converted received signal, and processes the resulting digital signal so as to estimate the target parameters.

Both sampling and subsequent signal processing are performed at a sub-Nyquist rate, i.e., at a rate that is considerably lower than the bandwidth of the radar signal. In the present example, processor 36 comprises a sub-Nyquist sampling unit 40, a Doppler focusing unit 44 and a parameter reconstruction unit 48. Units 44 and 48 are sometimes referred to herein jointly as digital processing circuitry, which carries out the digital signal processing functions described herein. The functions of the various units of processor 36 are explained in detail below.

The system configuration of FIG. 1 is an example configuration, which is chosen purely for the sake of conceptual clarity. In alternative embodiments, any other suitable system configuration can be used. The elements of system 20 may be implemented using hardware. Digital elements can be implemented, for example, in one or more off-the-shelf devices, Application-Specific Integrated Circuits (ASICs) or FPGAs. Analog elements can be implemented, for example, using discrete components and/or one or more analog ICs. Some system elements may be implemented, additionally or alternatively, using software running on a suitable processor, e.g., a Digital Signal Processor (DSP). Some system elements may be implemented using a combination of hardware and software elements.

In some embodiments, some or all of the functions of processor 36 may be implemented using a general-purpose computer, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Radar Model and Doppler Focusing

In the embodiments described herein, the radar signal transmitted by transceiver 32 comprises a series of P equally-spaced pulses h(t). The transmitted signal can thus be written as $$x_T(t) = \sum_{p=0}^{P-1} h(t - p\tau),\ 0 \leq t \leq P\tau \qquad [1]$$

wherein τ denotes the pulse-to-pulse delay, or Pulse Repetition Interval (PRI).

Assuming the transmitted signal is reflected by a set of L targets 24, the received signal can be written as $$x(t) = \sum_{p=0}^{P-1}\sum_{l=0}^{L-1} \alpha_l h(t - \tau_l - p\tau)e^{-j\nu_l p\tau} \quad [2]$$

wherein $\alpha_l$, $\tau_l$, $\nu_l$ denote the amplitude, delay and Doppler frequency of the $l^{th}$ target, respectively. The 3L parameters $\alpha_l$, $\tau_l$, $\nu_l$ l=0 . . . L-1 are referred to herein collectively as target parameters. Generally, $\alpha_l$, $\tau_l$, $\nu_l$ are indicative of the target Radar Cross Section (RCS), range and radial velocity, respectively.

It is possible to express the received signal as a sum of frames $$x(t) = \sum_{p=0}^{P-1} x_p(t) \text{ wherein} \quad [3]$$

$$x_p(t) = \sum_{l=0}^{L-1} \alpha_l h(t - \tau_l - p\tau)e^{-j\nu_l p\tau} \quad [4]$$

The radar's unambiguous time-frequency region is $[0,\tau]\times[-\pi/\tau,\pi/\tau]$.

In some embodiments, processor 36 evaluates a Doppler focusing function of the received signal, which is defined as $$\Phi(t;\nu) = \sum_{p=0}^{P-1} x_p(t+p\tau)e^{j\nu p\tau} = \ldots = \sum_{l=0}^{L-1} \alpha_l h(t-\tau_l) \sum_{p=0}^{P-1} e^{j(\nu-\nu_l)p\tau} \quad [5]$$

Consider the sum-of-exponents $\sum_{p=0}^{P-1} e^{j(\nu-\nu_l)p\tau}$ term in Equation [5]. Because of this term, for any Doppler frequency $\nu$, targets whose Doppler frequency $\nu_l$ is in the frequency band $\nu\pm\pi/P\tau$ (a spectral slice of bandwidth $2\pi/P\tau$ around $\nu$) will cause an in-phase accumulated peak or local maximum in $\Phi(t;\nu)$. For targets whose Doppler frequency is outside this band, the value of $\Phi(t;\nu)$ will effectively cancel out. The Doppler frequency band $\nu\pm\pi/P\tau$ is therefore referred to as "focus zone."

Thus, it is possible to approximate $\Phi(t;\nu)$ by the expression $$\Phi(t;\nu) \cong P \sum_{l\in\Lambda(\nu)} \alpha_l h(t - \tau_l) \quad [6]$$

wherein $\Lambda(\nu)=\{l:|\nu-\nu_l|<\pi/P\tau\}$, i.e., the set of targets inside the focus zone.

A similar Doppler focusing process can be defined and evaluated in the frequency domain. Transforming Equation [4] above to the frequency domain yields $$X_p(\omega) = H(\omega) \sum_{l=0}^{L-1} \alpha_l e^{-j\omega\tau_l} e^{-j\nu_l p\tau} \quad [7]$$

wherein $X_p(\omega)$ denotes the continuous-time Fourier transform (CTFT) of $x_p(t+p\tau)$.

Taking the CTFT of $\Phi(t;\nu)$ as a function of t yields $$\Psi(\omega;\nu) = \sum_{p=0}^{P-1} X_p(\omega)e^{j\nu p\tau} = H(\omega)\sum_{l=0}^{L-1} \alpha_l e^{-j\omega\tau_l} \sum_{p=0}^{P-1} e^{j(\nu-\nu_l)p\tau} \quad [8]$$

Similarly to $\Phi(t;\nu)$, $\Psi(\omega;\nu)$ is also expressed in terms of the 3L target parameters, namely the amplitudes, delays and Doppler frequencies of the L targets. The expression of $\Psi(\omega;\nu)$ also comprises the sum-of-exponents term $\sum_{p=0}^{P-1} e^{j(\nu-\nu_l)p\tau}$, which accumulates in-phase for targets in the focus zone and cancels-out for other targets.

The Doppler focusing function can be evaluated in practice from properly chosen sub-Nyquist samples. The description that follows shows how this function can be used for target estimation and detection. These operations are typically performed on the sub-Nyquist samples of the signal. Sub-Nyquist sampling schemes that can be used for obtaining such samples are described, for example, in U.S. Patent Application Publication 2013/0038479, cited above; and in "A Sub-Nyquist Radar Prototype: Hardware and Algorithms," Baransky et al., arXiv:1208.2515 [cs.IT], Aug. 13, 2012, which is incorporated herein by reference.

Use of Doppler Focusing for Reduction of Delay-Doppler Estimation to Delay-Only Estimation The Doppler focusing function comprises a two-dimensional function, which has local maxima that are indicative of targets. In other words, detecting a peak in $\Phi(\tau_T;\nu_T)$ is indicative of a target having a delay is $\tau_T$ and Doppler frequency $\nu_T$. This representation enables processor 36 to reduce the delay-Doppler estimation problem (estimating delays and Doppler frequencies of multiple targets over the system's unambiguous time-Doppler range) into a set of delay-only estimation problems (estimating the delays of multiple targets in a selected narrow slice of Doppler frequencies). This reduction can be carried out either in the time domain using $\Phi(t;\nu)$, or in the frequency domain using $\Psi(\omega;\nu)$.

In some embodiments, the target parameters are extracted directly from the Doppler focusing function. In alternative embodiments, the target parameters are extracted in an iterative process, one target at a time, while adapting the Doppler focusing function to remove the contribution of each target that has already been detected. These two alternatives are described in detail below. Further alternatively, the target parameters can be extracted from the Doppler focusing function in any other suitable way.

After reducing the problem dimensionality, processor 36 solves each delay-only estimation problem at a sub-Nyquist rate. Processor 36 may use various techniques for estimating the target delays for a selected Doppler frequency. Example techniques for reconstructing the 2L amplitudes and delays in a signal of the form $$\phi(t) = \sum_{l=0}^{L-1} \alpha_l h(t - \tau_l) \quad [9]$$

from sub-Nyquist samples are given, for example, in U.S. Patent Application Publication 2013/0038479, cited above. Such techniques are also described by Gedalyahu et al., in "Multichannel Sampling of Pulse Streams at the Rate of Innovation," IEEE Transactions on Signal Processing, volume 59, number 4, April, 2011, pages 1491-1504; by Vetterli et al., in "Sampling Signals with Finite Rate of Innovation," IEEE Transactions on Signal Processing, volume 50, number 6, 2002, pages 1417-1428; by Tur et al., in "Innovation Rate Sampling of Pulse Streams with Application to Ultrasound Imaging," IEEE Transactions on Signal Processing, volume 59, number 4, April, 2011, pages 1827-1842; and by Wagner et al., in "Compressed Beamforming in Ultrasound Imaging," IEEE Transactions on Signal Processing, volume 60, issue 9, September, 2012, pages 4643-4657, which are all incorporated herein by reference, as well as in the article by Baransky et al., cited above. Processor 36 may use any such technique, or any other suitable technique, for estimating the target delays for a given Doppler frequency at a sub-Nyquist rate.

When using these techniques, processor 36 typically pre-filters the signal $\phi(t)$ and then samples the pre-filtered signal, so as to obtain Fourier coefficients c [k] of the Fourier expansion of $\phi(t)$:

$$\phi(t) = \sum_{k \in Z} c[k] e^{\frac{j2\pi kt}{\tau}} \ t \in [0, \tau] \quad [10]$$

$$c[k] = \ldots = \frac{1}{\tau} H(2\pi k / \tau) \sum_{l=0}^{L-1} \alpha_l e^{-j2\pi k \tau_l / \tau} \quad [11]$$

In some embodiments, processor 36 (e.g., sampling unit 40) produces a set of coefficients c[k] by splitting the received signal into multiple processing channels, modulating the signal in each channel by a respective complex sinusoid, and integrating the result over [0, $\tau$]. A detailed description of such sampling schemes is given in U.S. Patent Application Publication 2013/0038479, cited above.

In alternative embodiments, processor 36 filters the signal with several band-pass filters, and then samples the output of each filter with a low sampling rate. Sampling of this sort is described in the article by Baransky et al., cited above. Further alternatively, processor 36 may perform sub-Nyquist sampling using multi-channel filters or multi-channel modulators. All of these techniques result in low-rate samples from which the Fourier coefficients c[k] can be obtained over a desired set of frequencies that is lower than the signal bandwidth.

From Equation [11] it can be seen that the target parameters $\alpha_l$, $\tau_l$ are embedded in the Fourier coefficients c[k] in the form of a complex sinusoid problem. Without noise, it can be shown that for such a problem, 2L coefficients are sufficient for reconstructing $\alpha_l$, $\tau_l$ l=0 . . . L−1.

Many reconstruction techniques for solving the sinusoid problem and reconstructing the coefficients are known in the art, for example annihilating filters, matrix pencil, ESPRIT and MUSIC, among others. MUSIC is described by Schmidt, in "Multiple Emitter Location and Signal Parameter Estimation," IEEE Transactions on Antennas and Propagation, volume 34, no. 3, March, 1986, pages 276-280, and by Bienvenu and Kopp, in "Adaptivity to Background Noise Spatial Coherence for High Resolution Passive Methods," IEEE International Conference on Acoustics, Speech and Signal Processing, volume 5, April, 1980, pages 307-310, which are incorporated herein by reference. ESPRIT, and is described by Roy and Kailath, in "ESPRIT—Estimation of Signal Parameters via Rotational Invariance Techniques," IEEE Transactions on Acoustics, Speech and Signal Processing, volume 37, no. 7, July, 1989, pages 984-995, which is incorporated herein by reference.

In other embodiments, an alternative compressed sensing scheme can be used for recovering the target delays from coefficients c[k] with improved performance in the presence of noise. Assume that the time delays are aligned to a grid $$\tau_l = n_l \Delta_\tau \ 0 \leq n_l \leq N_\tau \quad [12]$$

wherein $\Delta_\tau$ is chosen such that $N_\tau = \tau/\Delta_\tau$ is integer. If the time delays do not lie exactly on a grid, local interpolation may be used to reduce quantization errors. For a set of indices $\kappa = \{k_0, \ldots, k_{|\kappa|-1}\}$, we define the corresponding vector of Fourier coefficients $$c = [c[k_0] \ldots c[k_{|\kappa|-1}]]^T \quad [13]$$

Equation [11] above can be written in vector form as $$c = \frac{1}{\tau} HVx \quad [14]$$

wherein H is a $|\kappa| \times |\kappa|$ diagonal matrix with diagonal elements H ($2\pi k/\tau$), and V is a $|\kappa| \times N_\tau$ Vandermonde matrix with elements $V_{mq} = e^{-j2\pi k_m n/N_\tau}$. In other words, $V_{mq}$ comprises $|\kappa|$ rows of the $N_\tau \times N_\tau$ Discrete Fourier Transform (DFT) matrix.

The vector of target delays x is L-sparse, with the $n^{th}$ vector element gives the amplitude of a target with delay $n\Delta_\tau$ if such a target exists, or zero otherwise. Defining the Compressed Sensing (CS) dictionary $$A = \frac{1}{\tau} HV,$$

we get $$c = Ax \quad [15]$$

The target delays can be reconstructed by solving Equation [15] and finding the support of x, i.e., the set of indices of the non-zero elements in x. Any suitable CS technique can be used for solving Equation [15]. Example CS techniques are described by Eldar and Kutyniok, in "Compressed Sensing: Theory and Applications," Cambridge University Press, 2012, which is incorporated herein by reference.

The description now returns to the problem of reconstructing the target delays and amplitudes, for a given Doppler frequency, from the sub-Nyquist-sampled coefficients c[k]. Let $c_p$[k] denote the Fourier coefficients in the Fourier expansion of the component of the received signal contributed by the $p^{th}$ pulse:

$$c_p[k] = \frac{1}{\tau} H(2\pi k / \tau) \sum_{l=0}^{L-1} \alpha_l e^{-jv_l p\tau} e^{-j2\pi k \tau_l / \tau} \quad [16]$$

Similarly to Equation [14], we can write for each pulse p:

$$c_p = \frac{1}{\tau} HVx_p \quad [17]$$

From Equation [16] it can be seen that all 3L target parameters $\alpha_l$, $\tau_l$, $v_l$ are embedded in the Fourier coefficients $c_p$[k] in the form of a complex sinusoid problem. The number of Fourier coefficients sampled for each pulse, $|\Lambda|$, sets the trade-off between sampling rate and robustness to noise.

Thus, in some embodiments sampling unit 40 acquires Fourier coefficients $c_p[k]$ with a sub-Nyquist sampling rate. Based on this set of coefficients, Doppler focusing unit 44 evaluates the Doppler focusing function in the frequency domain:

$$\Psi_\nu[k] = \sum_{p=0}^{P-1} c_p[k]e^{j\nu p\tau} = \frac{1}{\tau}H(2\pi k/\tau)\sum_{l=0}^{L-1}\alpha_l e^{-j2\pi k\tau_l/\tau}\sum_{p=0}^{P-1}e^{j(\nu-\nu_l)p\tau} \quad [18]$$

As discussed above, for each target 1 whose Doppler frequency $\nu_l$ is within the focus zone of the selected Doppler frequency $\nu$ (i.e., $|\nu_l-\nu|<\pi/P\tau$), we get $$\sum_{p=0}^{P-1}e^{j(\nu-\nu_l)p\tau} \cong P \quad [19]$$

Therefore, Doppler focusing can be performed on the low rate sub-Nyquist samples:

$$\Psi_\nu[k] \cong \frac{P}{\tau}H(2\pi k/\tau)\sum_{l\in\Lambda(\nu)}\alpha_l e^{-j2\pi k\tau_l/\tau} \quad [20]$$

Thus, for any Doppler frequency $\nu$ we get a delay-only estimation problem of the form $$\Psi_\nu = \frac{P}{\tau}HVx_\nu \quad [21]$$

wherein $x_\nu$ is L-sparse and $$\Psi_\nu=[\Psi_\nu[k_0] \ldots \Psi_\nu[k_{|\kappa|-1}]]^T \quad [22]$$

This problem is identical to the CS problem of Equations [14]-[15] above. Note that, unlike other CS schemes that estimate delay and Doppler frequency, in the disclosed technique the CS dictionary does not grow with the number of pulses.

The Doppler focusing function of Equation [18] above is a continuous function of $\nu$, and can be evaluated for any Doppler frequency up to the Pulse Repetition Frequency (PRF, defined as 1/PRI). The Doppler focusing function has no "blind speeds," i.e., target velocities that are undetectable.

Let $$C = \{c_p[k]\}_{0\leq p<P}^{k\in K}$$

denote the set of above-described Fourier coefficients, and let $\Psi_\nu(C)$ denote the vector of Doppler-focused coefficients of equation [22] that were obtained from C using Equation [18]. Therefore, $x_\nu(C)$ can be recovered from $\Psi_\nu(C)$ for any $\nu$. Typically, processor 36 searches for large values of $|x_\nu(C)[n]|$, which are indicative of targets. For each identified peak, processor 36 estimates the target delays and Doppler frequencies as $n\Delta_\tau$ and $\nu$, respectively.

In some embodiments, processor 36 runs an iterative process that finds a peak associated with a target, estimates the target parameters, adjusts the set of Fourier coefficients so as to remove the contribution of this target, and re-evaluates the Doppler focusing function using the adjusted Fourier coefficients. This sort of iterative process improves the capability to detect weak targets and removes spurious targets that may be generated by processing side-lobes.

The iterative process continues until some termination criterion is met. For example, if the number of targets L is known, processor 36 may continue the iterations until L targets are found. If the number of targets is unknown, the process may terminate when the identified peak drops below some amplitude threshold. The iterative process is summarized by the following example pseudo-code:

---

In: Samples $C = \{c_p[k]\}_{0\leq p<P}^{k\in K}$, number of targets L

Out: Estimated target parameters $\{\hat{\alpha}_l, \hat{\tau}_l, \hat{\nu}_l\}_{l=0}^{L-1}$ Initialization $R = \{r_p[k]\}_{0\leq p<P}^{k\in K} \leftarrow C$ for l = 0 to L − 1 do $(\hat{n}_l, \hat{\nu}_l) \leftarrow \text{argmax}_{0<\hat{n}\leq N_\tau} |x_{\hat{\nu}}(R)[\hat{n}]|$ using [21]

$-\pi/\tau\leq\hat{\nu}<\pi/\tau$ $\hat{\tau}_l \leftarrow \hat{n}_l\Delta_\tau$
    $\hat{\alpha}_l \leftarrow x_{\hat{\nu}_l}(R)[\hat{n}_l]$
    for $k \in \kappa$ and $0 \leq p < P$ do $r_p[k] \leftarrow r_p[k] - \frac{1}{\tau}H(2\pi k/\tau)\hat{\alpha}_l e^{-j2\pi k\hat{\tau}_l/\tau}e^{-j\hat{\nu}_l p\tau}$ end for end for

---

As noted above, this process is depicted purely by way of example. In alternative embodiments, processor 36 may recover the target parameters from the Doppler focusing function using any other suitable process, whether iterative or non-iterative.

In the above process, although the total number of targets is known, the distribution of the targets in the delay-Doppler plane is typically unknown. Therefore, when solving Equation [21] inside the above loop, processor 36 may estimate the model order $0\leq L_\nu\leq L$, or make a worst-case assignment $L_\nu=L$. Processor 36 may alternatively stop the iterations upon detecting that the progress of the iterative process (e.g., reduction of error between successive iterations) falls below some predefined threshold.

In various embodiments, processor 36 may solve Equation [21] using any suitable method, e.g., one of many known methods for estimating the number of sinusoids in a noisy sequence. Solving Equation [21] with a accurate model order may decrease computation time, and may reduce detection of false targets. This option may be preferable in high Signal-to-Noise Ratio (SNR) scenarios when the $L_\nu$ estimates are accurate. When SNR is poor, the worst case approach that assumes $L_\nu=L$ may perform better.

Since V is a partial Fourier matrix, the problem defined in Equation [21], after normalization by $H^{-1}$, or any other equalizer such as a matched filter, Wiener filter etc., is equivalent to the problem of recovering the individual frequencies from a sum of complex exponentials. Many techniques are known for solving this problem, and processor 36 may use any such method instead of CS. CS may be preferable for low-SNR scenarios. However, since Doppler focusing is independent of the underlying delay estimation, in various scenarios CS can be replaced with alternative delay estimation methods. For example, when noise is not a dominant factor, processor 36 may use an annihilating filter or MUSIC method instead of CS.

In some embodiments, processor 36 evaluates the argmax term above over a uniform grid of M Doppler frequencies. In these embodiments, it is possible to evaluate the Doppler focusing function efficiently using a length-M DFT or Fast Fourier Transform (FFT) of a series of length P:

$$\Psi_m[k] = DFT_M\{c_p[k]\} \quad [23]$$

The following pseudo-code carries out Doppler focusing-based parameter estimation for the case of Doppler frequencies lying on a uniform grid:

---

In: Samples $C = \{c_p[k]\}_{\substack{k \in K \\ 0 \leq p < P}}$, number of targets L, Doppler grid size M.

Out: Estimated target parameters $\{\hat{\alpha}_l, \hat{\tau}_l, \hat{v}_l\}_{l=0}^{L-1}$ Initialization $R = \{r_p[k]\}_{\substack{k \in K \\ 0 \leq p < P}} \leftarrow C$ for l = 0 to L − 1 do Create $\{\Psi_m\}_{m=-M/2}^{M/2-1}$ from R using Equation [23]

$(\hat{n}_l, \hat{m}_l) \leftarrow \text{argmax}_{\substack{0 < \hat{n} \leq N_\tau \\ -\pi/\tau \leq \hat{m} < \pi/\tau}} |x_{\hat{m}}(R)[\hat{n}]|$ using [21]

$\hat{\tau}_l \leftarrow \hat{n}_l \Delta_\tau$
    $\hat{v}_l \leftarrow 2\pi \hat{m}_l / \tau M$
    $\hat{\alpha}_l \leftarrow x_{\hat{m}_l}(R)[\hat{n}_l]$
    for $k \in \kappa$ and $0 \leq p < P$ do $r_p[k] \leftarrow r_p[k] - \frac{1}{\tau} H(2\pi k/\tau) \hat{\alpha}_l e^{-j2\pi k \hat{\tau}_l/\tau} e^{-j\hat{v}_l p\tau}$ end for
end for

---

In some embodiments, processor 36 applies windowing when evaluating the Doppler focusing function. In an example embodiment, multiplies the expression of Equation [18] above by a suitable window function w[p], p=0, . . . , P−1, such as a Hann or Blackman window. Windowing helps to reduce the effect of targets that are nearby one another in the delay-Doppler plane. On the other hand, windowing increases the size of the focus zone. Windowing is important, for example, when the dynamic range of target amplitudes is large.

Figure 2:
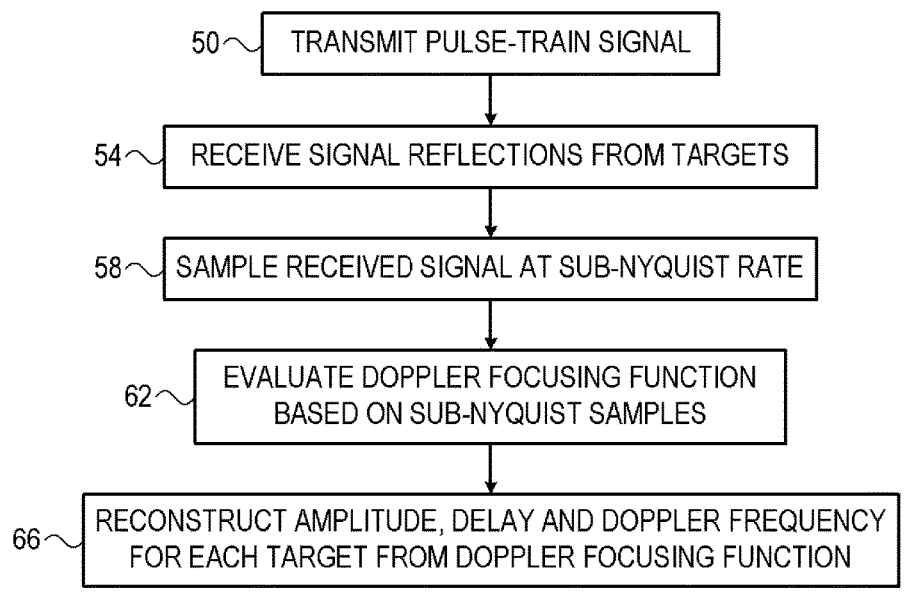
FIG. 2 is a flow chart that schematically illustrates a method for sub-Nyquist radar processing, in accordance with an embodiment of the present invention.

FIG. 2 is a flow chart that schematically illustrates a method for sub-Nyquist radar processing, in accordance with an embodiment of the present invention. The method begins with transceiver 32 of radar system 20 transmitting a pulse-train signal, at a transmission step 50. Transceiver 32 receives a received signal, which comprises reflections of the pulses from one or more targets 24, at a reception step 54. The transceiver down-converts the received signal and provides it to processor 36.

In processor 36, sampling unit 40 samples the received signal with a sub-Nyquist rate, at a sampling step 58. Doppler focusing unit 44 evaluates the Doppler focusing function based on the sub-Nyquist sampled signal, at a Doppler focusing step 62. Parameter reconstruction unit 48 reconstructs the amplitudes, delays and Doppler frequencies (corresponding to the RCS, range and radial velocity) of the targets from the Doppler focusing function, at a parameter reconstruction step 66. The reconstructed target parameters are provided as output of system 20, e.g., displayed to an operator using a suitable display.

Although the embodiments described herein mainly address radar applications, the methods and systems described herein can also be used in other applications that involve estimating signal delays and Doppler frequencies, such as in estimation of multipath mobile communication channels, ultrasound imaging, sonar, radar imaging (e.g., Synthetic Aperture Radar—SAR), or in any other type of receiver that coherently integrates signals having different Doppler frequencies.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for target range and velocity estimation, the method comprising:
receiving a signal comprising reflections of multiple pulses from one or more targets;
digitizing the received signal, by sampling the signal with a sampling rate that is lower than a Nyquist rate of the pulses, so as to produce a sampled signal;
representing each reflection, as digitized in the sampled signal, by a respective complex exponent whose magnitude depends on a delay of the reflection and whose phase depends on a Doppler frequency of that reflection;
accumulating the complex exponents on a Doppler-delay grid so as to cause the reflections to accumulate in-phase in Doppler-delay bins corresponding to the Doppler frequencies and delays of the targets;
finding, on the Doppler-delay grid, one or more peaks caused by the accumulated complex exponents;
calculating respective Doppler frequencies and delays corresponding to the peaks;
estimating respective ranges and radial velocities for the identified Doppler frequencies and delays; and
providing the estimated ranges and radial velocities as an output identifying the one or more targets from which the signal was received.

2. The method according to claim 1, wherein accumulating the complex exponents comprises processing the sampled signal at a processing rate that is lower than the Nyquist rate.

3. The method according to claim 1, wherein estimating the ranges and the radial velocities comprises defining multiple Doppler-frequency bands and, for each band in at least a subset of the bands, estimating delays for one or more of the targets whose Doppler frequency falls in the band.

4. The method according to claim 1, wherein estimating the ranges and the radial velocities comprises identifying a given peak in the Doppler-delay grid, deriving a delay and a Doppler frequency of a target from the given peak, adjusting the sampled signal to remove a contribution of the target, re-evaluating the Doppler-delay grid based on the adjusted sampled signal, and searching for a next peak in the re-evaluated Doppler-delay grid.

5. The method according to claim 1, wherein accumulating the complex exponents comprises calculating a Fourier transform coefficient matrix over a uniform grid of Doppler frequencies.

6. The method according to claim 1, wherein accumulating the complex exponents comprises accumulating the complex exponents using a window function.

7. The method according to claim 1, wherein accumulating the complex exponents comprises defining a Doppler focusing function that gives the accumulated complex exponents as a function of Doppler frequency and delay, wherein the Doppler focusing function comprises a sum of multiple exponents.

8. Apparatus for target range and velocity estimation, the apparatus comprising:
a sampling unit, which is configured to digitize a received signal that comprises reflections of multiple pulses from one or more targets, by sampling the signal with a sampling rate that is lower than a Nyquist rate of the pulses, so as to produce a sampled signal; and
digital processing circuitry, which is configured to:
represent each reflection, as digitized in the sampled signal, by a respective complex exponent whose magnitude depends on a delay of the reflection and whose phase depends on a Doppler frequency of that reflection;
accumulate the complex exponents on a Doppler-delay grid so as to cause the reflections to accumulate in-phase in Doppler-delay bins corresponding to the Doppler frequencies and delays of the targets;
identify on the Doppler-delay grid one or more peaks caused by the accumulated complex exponents;
calculate respective Doppler frequencies and delays corresponding to the peaks;
estimate respective ranges and radial velocities for the identified Doppler frequencies and delays; and
provide the ranges and radial velocities as an output identifying the targets from which the signal was received.

9. The apparatus according to claim 8, wherein the digital processing circuitry is configured to process the sampled signal at a processing rate that is lower than the Nyquist rate.

10. The apparatus according to claim 8, wherein the digital processing circuitry is configured to define multiple Doppler-frequency bands and, for each band in at least a subset of the bands, to estimate delays for one or more of the targets whose Doppler frequency falls in the band.

11. The apparatus according to claim 8, wherein the digital processing circuitry is configured to identify a given peak in the Doppler-delay grid, to derive a delay and a Doppler frequency of a target from the given peak, to adjust the sampled signal to remove a contribution of the target, to re-evaluate the Doppler-delay grid based on the adjusted sampled signal, and to search for a next peak in the re-evaluated Doppler-delay grid.

12. The apparatus according to claim 8, wherein the digital processing circuitry is configured to accumulate the complex exponents by calculating a Fourier transform coefficient matrix over a uniform grid of Doppler frequencies.

13. The apparatus according to claim 8, wherein the digital processing circuitry is configured to window the accumulated complex exponents using a window function.

14. Apparatus for target range and velocity estimation, comprising:
a receiver, which is configured to receive a signal that comprises reflections of multiple pulses from one or more targets; and
a processor, which is configured to:
sample the received signal with a sampling rate that is lower than a Nyquist rate of the pulses, so as to produce a sampled signal;
represent each reflection, as digitized in the sampled signal, by a respective complex exponent whose magnitude depends on a delay of the reflection and whose phase depends on a Doppler frequency of that reflection;
accumulate the complex exponents on a Doppler-delay grid so as to cause the reflections to accumulate in-phase in Doppler-delay bins corresponding to the Doppler frequencies and delays of the targets;
identify on the Doppler-delay grid one or more peaks caused by the accumulated complex exponents;
calculate respective Doppler frequencies and delays corresponding to the peaks;
estimate respective ranges and radial velocities for the identified Doppler frequencies and delays; and
provide the ranges and radial velocities as an output identifying the targets from which the signal was received.

15. The apparatus according to claim 14, wherein the processor is configured to process the sampled signal at a processing rate that is lower than the Nyquist rate.

16. The apparatus according to claim 14, wherein the processor is configured to define multiple Doppler-frequency bands and, for each band in at least a subset of the bands, to estimate delays for one or more of the targets whose Doppler frequency falls in the band.

17. The apparatus according to claim 14, wherein the processor is configured to identify a given peak in the Doppler-delay grid, to derive a delay and a Doppler frequency of a target from the given peak, to adjust the sampled signal to remove a contribution of the target, to re-evaluate the Doppler-delay grid based on the adjusted sampled signal, and to search for a next peak in the re-evaluated Doppler-delay grid.

18. The apparatus according to claim 14, wherein the processor is configured to accumulate the complex exponents by calculating a Fourier transform coefficient matrix over a uniform grid of Doppler frequencies.

19. The apparatus according to claim 14, wherein the processor is configured to window the accumulated complex exponents using a window function.

20. The apparatus according to claim 14, wherein the processor is configured to accumulate the complex exponents by defining a Doppler focusing function that gives the accumulated complex exponents as a function of Doppler frequency and delay, wherein the Doppler focusing function comprises a sum of multiple exponents.

* * * * *